United States Patent
Lin

(10) Patent No.: US 7,400,731 B2
(45) Date of Patent: Jul. 15, 2008

(54) SCALABLE TECHNIQUE FOR ENSURING REAL-TIME, END-TO-END SECURITY IN A MULTIMEDIA MOBILE NETWORK

(76) Inventor: Jeou-Kai Lin, 1286 Colleen Way, Campbell, CA (US) 95008

( * ) Notice: Subject to any disclaimer, the term of this patent is extended or adjusted under 35 U.S.C. 154(b) by 563 days.

(21) Appl. No.: 10/863,096

(22) Filed: Jun. 7, 2004

(65) Prior Publication Data
US 2005/0273594 A1    Dec. 8, 2005

(51) Int. Cl.
*H04K 1/00* (2006.01)
(52) U.S. Cl. .................. 380/272; 713/168; 726/15; 726/21
(58) Field of Classification Search ................ 380/272; 713/168; 726/15, 21
See application file for complete search history.

(56) References Cited

U.S. PATENT DOCUMENTS

| 7,046,647 B2 * | 5/2006 | Oba et al. ................. 370/331 |
| 2004/0120328 A1 * | 6/2004 | Adrangi et al. ............. 370/401 |
| 2004/0208151 A1 * | 10/2004 | Haverinen et al. .......... 370/338 |
| 2005/0113109 A1 * | 5/2005 | Adrangi et al. .......... 455/456.1 |

* cited by examiner

*Primary Examiner*—Emmanuel L Moise
*Assistant Examiner*—Paul Callahan
(74) *Attorney, Agent, or Firm*—James Cai; Douglas MacKenzie; Schein & Cai LLP

(57) ABSTRACT

A method for handing off a connection of a mobile device from a primary VPN to which the mobile device is connected to an angel VPN to which the mobile device may be connected in an Internet Protocol-based multimedia mobile network includes the steps of searching for alternative available routes to a peer, creating the angel VPN for storage in the mobile device and replacing the primary VPN with the angel VPN in a case where the primary VPN is disrupted.

2 Claims, 3 Drawing Sheets

SCALABLE TECHNIQUE FOR ENSURING REAL-TIME, END-TO-END SECURITY IN A MULTIMEDIA MOBILE NETWORK

BACKGROUND OF THE INVENTION

The present invention generally relates to mobile communications systems and more particularly to a scalable system and method for ensuring real-time, end-to-end security in a multimedia mobile network.

Internet Protocol Security (IPSec) VPN has become one of the most efficient technologies for protecting end-to-end transmission security across public networks such as Internet Protocol based multimedia mobile networks. However this VPN implementation suffers from several disadvantages. Most significantly, when roaming between different VPN subnets, a current session may be terminated.

Prior art systems and methods for addressing this problem include providing a flat subnet for supporting thousands of wireless users. This solution is clearly not scalable. Furthermore, it is cumbersome to propagate a single subnet everywhere across a campus. With large subnets, performance is impacted adversely due to a significant number of-broadcasts in each domain. For real-time applications in particular, small CPU-powered devices may be broadcast intensive and too many users in one VLAN will quickly degrade performance and increase latency leading to poor quality stream communication.

Another prior art solution includes the implementation of a proxy Mobile IP. This solution is complex to configure, requiring changes to the LAN routing infrastructure. Furthermore, Mobile IP suffers from problems with network discovery and timing causing breaks that can last several seconds and result in loss of session persistence which ultimately harms real time applications.

A further prior art solution includes the deployment of a wireless switch/gateway within the wireless network. While this solution may solve the issue of secure handoffs to roaming mobile devices, additional burdens to existing VPN concentrators and congestion of network traffic make this solution disadvantageous. Furthermore, this solution may produce significant amounts of delay and prevent the deployment of time-sensitive applications such as voice, video, and real-time data.

While the systems and methods of the prior art provide solutions to the problems associated with roaming between different VPN subnets, there continues to be a need for a system and method that reduces latency and that ensures the security and session continuity as mobile devices roam between different VPN subnets. Such a system and method preferably does not require any changes to the network infrastructure.

SUMMARY OF THE INVENTION

In accordance with one aspect of the invention, a method for handing off a connection of a mobile device from a primary VPN to which the mobile device is connected to an angel VPN to which the mobile device may be connected in a multimedia mobile network includes the steps of searching for alternative routes to a peer, creating the angel VPN for storage in the mobile device, the creation comprising negotiating, authenticating and building up the angel VPN, and replacing the primary VPN with the angel VPN in a case where the primary VPN is disrupted.

In accordance with another aspect of the invention, a system for handing off a connection of a mobile device from a primary VPN to which the mobile device is connected to an angel VPN to which the mobile device may be connected in a multimedia mobile network includes a mobile device processor operable to execute program instructions for searching for alternative available routes to a peer, creating the angel VPN, the creation comprising negotiating, authenticating and building up the angel VPN, and replacing the primary VPN with the angel VPN in a case where the primary VPN is disrupted.

These and other features, aspects and advantages of the present invention will become better understood with reference to the following drawings, description and claims.

DETAILED DESCRIPTION OF THE INVENTION

The following detailed description is of the best mode of carrying out the invention. The description is not to be taken in a limiting sense, but is made merely for the purpose of illustrating the general principles of the invention, since the scope of the invention is best defined by the appended claims.

The present invention generally provides a scalable system and method for ensuring, real-time, end-to-end security in a multimedia mobile network. An angle VPN may be created in a mobile device for monitoring the network connections and sharing the same application session information with a primary VPN to which the mobile device may be connected. At a point when the primary VPN is disrupted, as when the mobile device roams and the connection must be handed off, the angel VPN may continue the session with the same degree of security assurance.

Figure 1:
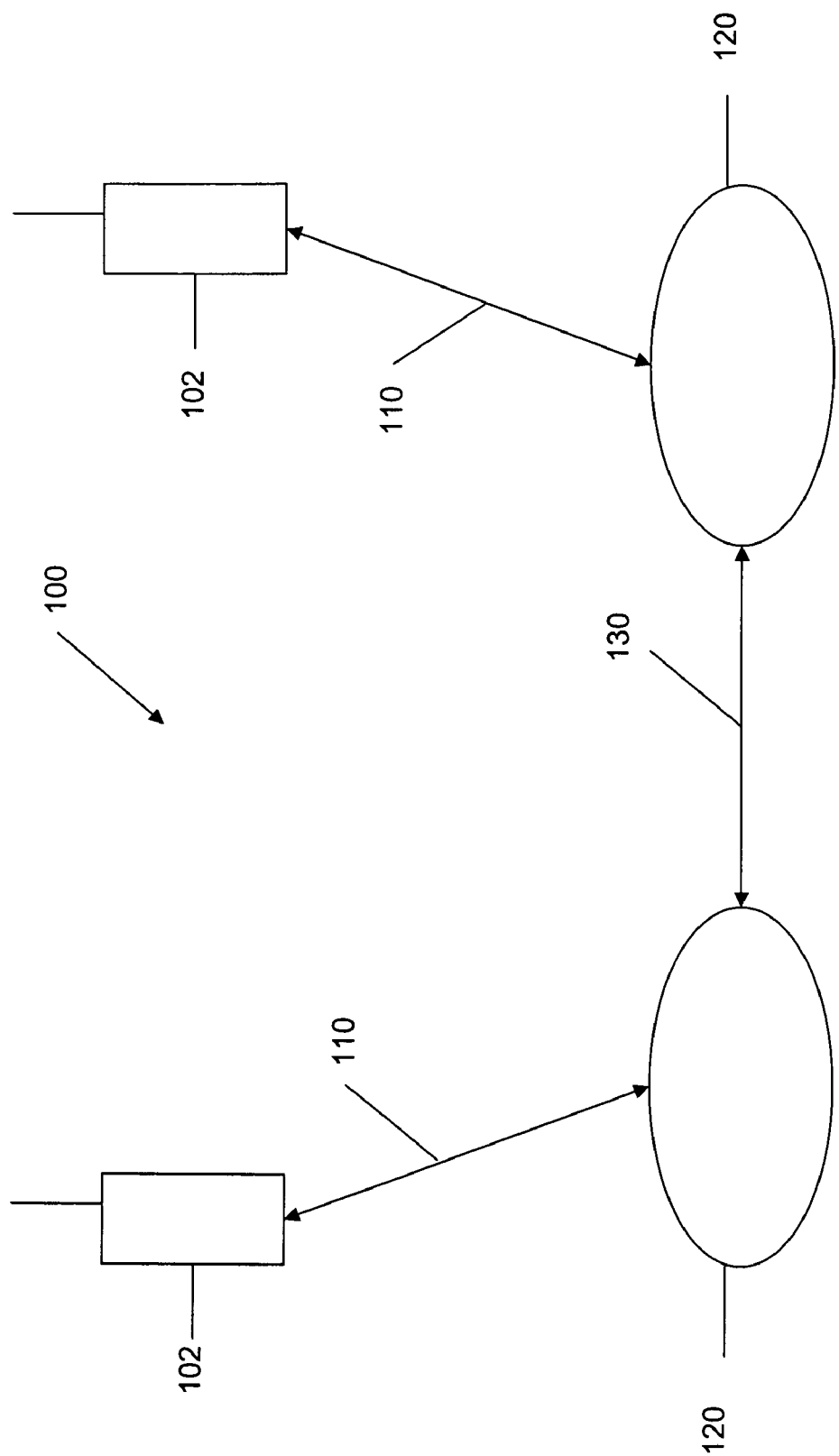
FIG. 1 is a schematic representation of a mobile communications system in accordance with the invention.

With reference to FIG. 1, a mobile communication system generally designated 100 may include a plurality of mobile devices 102 coupled to access points 120 via links 110. Access points 120 are coupled via link 130 and may comprise a VPN. Mobile devices 102 may include wireless telephones and other multimedia communication devices. Access points 120 may include fixed or mobile routers, network nodes, and gateways. Link 110 is preferably a wireless link while link 130 may be wireless or wired. While only two mobile devices 102 and two access points 120 are shown, it will be appreciated by those skilled in the art that the system and method of the invention may accommodate many such mobile devices 102 and access points 120.

Figure 2:
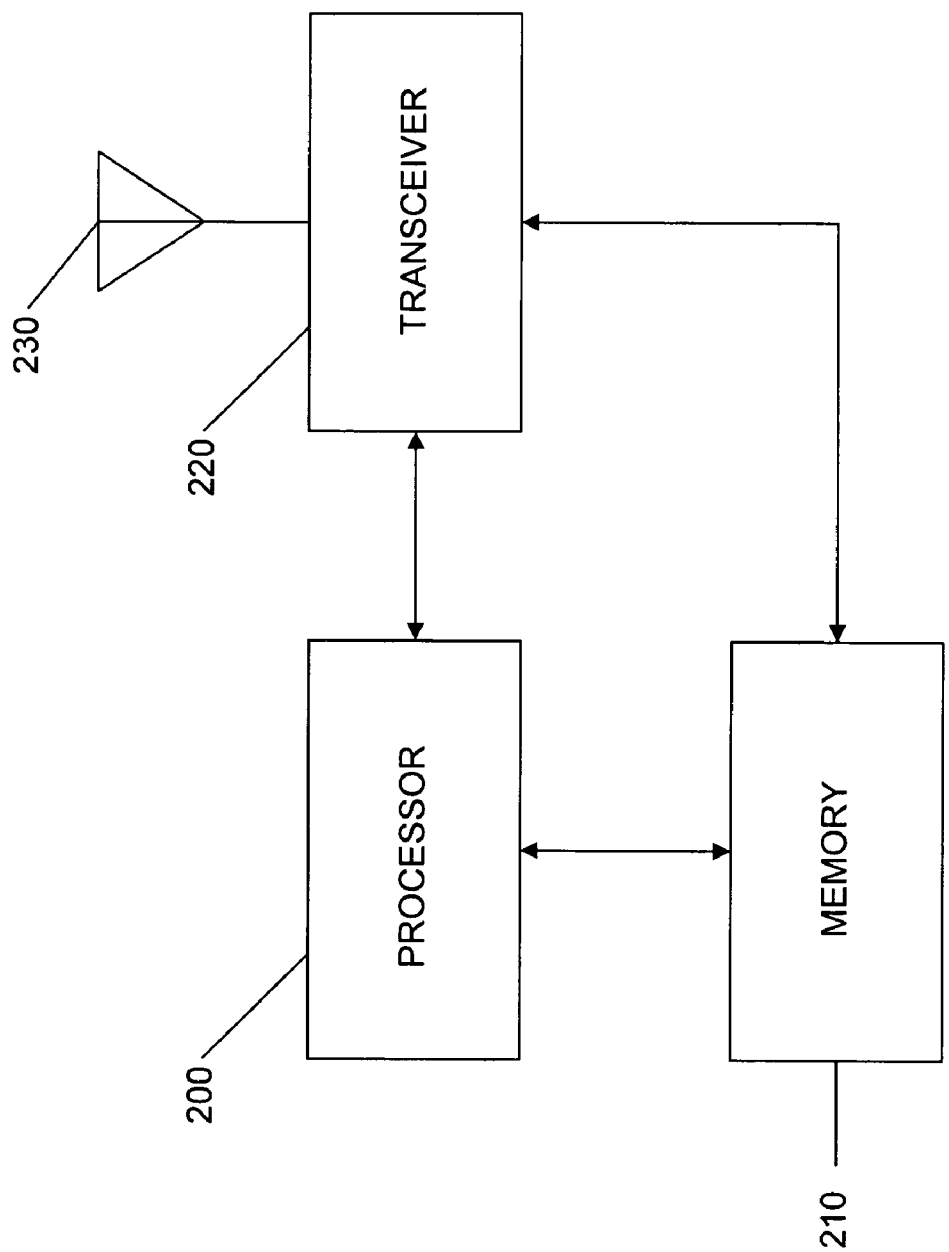
FIG. 2 is a schematic representation of a mobile device in accordance with the invention.

As shown in FIG. 2, mobile devices 102 and access points 120 may include a processor 220 coupled to a memory 210 and a transceiver 220. An antenna 230 may be coupled to transceiver 220. Processor 220 may be operable to perform the method steps a handoff method in accordance with one aspect of the invention. Memory 210 may be operable to store program instructions for carrying out the method steps as described herein.

Figure 3:
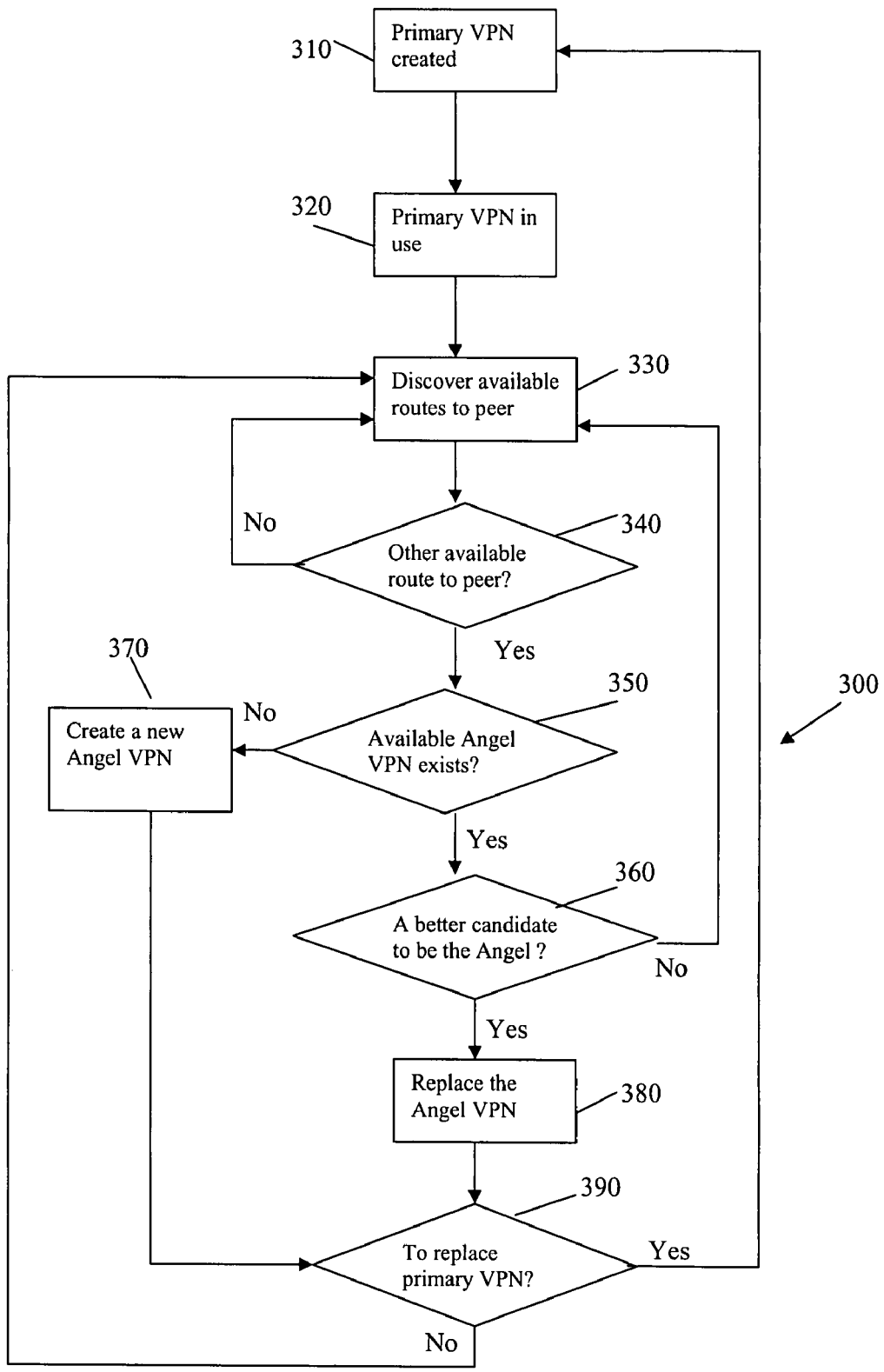
FIG. 3 is a flow chart of a method in accordance with the invention.

A scalable method for a handoff from a primary VPN to a second VPN in an IP-based multimedia mobile network generally designated 300 is shown in FIG. 3. In a step 310 a primary VPN for the session may be created and in a step 320 the primary VPN may be used by the mobile device 102. Alternative available routes to a peer may be searched for in a step 330. In a step 340 it may be determined if alternative routes are available. If none are available, the method returns to step 330, else in a step 350 it may be determined if an angel VPN exists. If the angel VPN does not exist, then the angel VPN may be created in a step 370. The angel VPN may reside in the memory 210 of mobile device 102 and be operable to continue the session in the case where the primary VPN is disrupted. The angel VPN may be negotiated, authenticated, and built up in step 370.

If the angel VPN does exist, then in a step 360 it may be determined if a better candidate exists for the angel VPN. If no better candidate exists, then the method may return to step 330, else in a step 380 the angel VPN resident on the mobile device 102 may be replaced with the better angel VPN.

In a step 390 it may be determined if the primary VPN has been disrupted and must be replaced by the angel VPN. If the primary VPN has not been disrupted then the method returns to step 330 and alternative available routes to a peer may be searched. If the primary VPN has been disrupted, then the method returns to step 310 in which the angel VPN becomes the primary VPN ensuring real-time, end-to-end security with a minimum of latency.

A system for providing a handoff in an IP-based multimedia mobile network may include program instructions stored in memory 210 for execution by processor 200 of method 300.

It should be understood, of course, that the foregoing relates to preferred embodiments of the invention and that modifications may be made without departing from the spirit and scope of the invention.

I claim:

1. A method of handing off a connection of a mobile device from a primary VPN to which the mobile device is connected to an angel VPN to which the mobile device may be connected in a multimedia mobile network comprising the steps of:
   searching for alternative available routes to a peer;
   creating the angel VPN for storage in the mobile device, the creation comprising negotiating, authenticating and building up the angel VPN;
   replacing the primary VPN with the angel VPN in a case where the primary VPN is disrupted; and
   wherein the searching, creating and replacing steps are performed by a mobile device client.

2. A system for handing off a connection of a mobile device from a primary VPN to which the mobile device is connected to an angel VPN to which the mobile device may be connected in a multimedia mobile network comprising:
   a mobile device processor operable to execute program instructions for:
   searching for alternative available routes to a peer, creating the angel VPN for storage in the mobile device, the creation comprising negotiating, authenticating and building up the angel VPN, and replacing the primary VPN with the angel VPN in a case where the primary VPN is disrupted.

* * * * *